United States Patent [19]
Kurumaji et al.

[11] Patent Number: 4,923,383
[45] Date of Patent: May 8, 1990

[54] APPARATUS FOR MOLD ALIGNING IN A COMPRESSION MOLDING MACHINE

[75] Inventors: Masanobu Kurumaji; Naoki Takeuchi, both of Kobe; Tutomu Sano, Toyonaka; Kazuyuki Kajiyama, Akashi; Hiroaki Kondo; Etujiro Imanishi, both of Kobe, all of Japan

[73] Assignee: Kabushiki Kaisha Kobe Seiko Sho, Kobe, Japan

[21] Appl. No.: 289,037

[22] Filed: Dec. 23, 1988

[30] Foreign Application Priority Data

Dec. 26, 1987 [JP] Japan ............................ 62-198653[U]
Apr. 7, 1988 [JP] Japan ................................. 63-86791

[51] Int. Cl.$^5$ ............................................. B29C 43/58
[52] U.S. Cl. ...................................... 425/150; 100/46; 264/40.5; 264/258; 425/451.7
[58] Field of Search .................... 264/40.1, 40.5, 328.1; 425/138, 150, 168, 589, 450.1, 450.7; 100/35, 46, 48, 258 R, 258 A

[56] References Cited

U.S. PATENT DOCUMENTS

| | | | |
|---|---|---|---|
| 3,562,474 | 2/1971 | Sellmann et al. | 100/258 |
| 3,669,599 | 6/1972 | Snider et al. | 425/451.7 |
| 4,470,787 | 9/1984 | Gram | 425/150 |
| 4,648,823 | 3/1987 | Yashima | 100/46 |
| 4,784,058 | 11/1988 | Nakagawa et al. | 100/46 |

FOREIGN PATENT DOCUMENTS

60-15119  1/1985  Japan .

*Primary Examiner*—Jill L. Heitbrink
*Attorney, Agent, or Firm*—Oblon, Spivak, McCelland, Maier & Neustadt

[57] ABSTRACT

A mold aligning method and device for a compression molding machine which includes a bed, a plurality of uprights standing upright on the bed, a crown block joined to the tops of the uprights, a slide block guided for vertical sliding movement by the uprights, and a hydraulic cylinder actuator mounted on the crown block to drive the slide block for vertical sliding movement, for maintaining an upper mold attached to the lower surface of the slide block in parallel to a mating lower mold during a compression-molding operation. The mold aligning device includes a plurality of mold position adjusting cylinder actuators disposed on the bed, a plurality of position detectors associated respectively with the mold position adjusting cylinder actuators to detect the strokes of the latter, a hydraulic source for driving the mold position adjusting cylinder actuators, and a control unit for controlling the strokes of the piston rods of the mold position adjusting cylinder actuators with reference to the zero points of the piston rods of the mold position adjusting cylinder actuators determined beforehand. The zero points are determined by placing the upper mold in close contact with the lower mold and extending the piston rods of the mold position adjusting cylinder actuators so that the piston rods are pressed against the lower surface of the slide block. The strokes of the piston rods are controlled during a compression-molding operation so that the upper mold is maintained precisely in parallel with the lower mold.

4 Claims, 7 Drawing Sheets

APPARATUS FOR MOLD ALIGNING IN A COMPRESSION MOLDING MACHINE

BACKGROUND OF THE INVENTION

1. Field of the Invention

The present invention relates to a method of aligning a moveable mold and a mating fixed mold on a compression molding machine for molding a resin work piece formed of a thermoset plastic resin or the like, and a device for carrying out the method.

2. Description of the Prior Art

Japanese Patent Laid-open (Kokai) Nos. 60-15119 and 60-30323 disclose compression molding machines for forming automotive front panels, automotive body panels and the like by compression-molding a sheet molding compound (SMC), namely, a thermoset plastic resin sheet.

The compression molding machine disclosed in Japanese Patent Laid-open No. 60-15119 comprises a bed, uprights set upright on the bed, a crown block supported by the uprights, a hydraulic cylinder actuator mounted on the crown block, a slide block joined to the lower end of the piston rod of the hydraulic cylinder and guided for vertical movement by the uprights, and at least a pair of mold position adjusting cylinder actuators fixedly mounted on the bed. An upper mold is fixed to the lower surface of the slide block, and a lower mold is fixed to the bed to compression-mold a resin work piece in a cavity formed by the upper and lower molds.

In compression-molding a thermoset plastic resin sheet, such as a SMC, on such a compression molding machine, the upper mold must be held in parallel to the lower mold with a high degree of accuracy on the order of 5/100 mm, to obtain molding of satisfactory quality. To meet such a requirement, the position of the slide block is adjusted by the mold position adjusting cylinder actuators to maintain the upper mold in parallel with the lower mold.

In adjusting the respective zero points of the piston rods of the mold position adjusting cylinder actuators, the upper mold is brought into close contact with the lower mold, the respective piston rods of the mold position adjusting cylinder actuators are projected by the same length, and then shims are placed between the respective upper ends of the piston rods and the lower surface of the slide block so that the slide block is born evenly on the piston rods.

This zero-point adjusting procedure must be executed every time the mold is changed, thus requiring troublesome adjusting work, because different molds are different from each other in height, which requires a stock of many reserve shims and reduces production efficiency. Furthermore, the gaps between the piston rods and the slide block must be measured to select appropriate shims, which entails errors in measuring the thickness of shims and the size of the gaps, and hence it is impossible to achieve the zero-point adjustment with a high degree of accuracy.

OBJECT OF THE INVENTION

Accordingly, it is an object of the present invention to provide a mold aligning method for a compression molding machine that is capable of very easily achieving zero-point adjustment of the piston rods of the mold position adjusting cylinder actuators with a high degree of accuracy without using shims.

It is another object of the present invention to provide a mold aligning device capable of automatically achieving zero-point adjustment of the piston rods of the mold position adjusting cylinders.

SUMMARY OF THE INVENTION

In one aspect of the present invention, a mold aligning method for a compression molding machine comprises a bed, a slide block supported for vertical sliding movement above the bed, driving means for vertically moving the slide block, a mold consisting of an upper mold attached to the slide block and a lower block fixed to the bed, and a plurality of mold position adjusting cylinder actuators mounted on the bed for controlling the mold position adjusting cylinder actuators so that the upper mold is kept parallel to the lower mold in compression-molding a work piece by the mold. The compression molding machine sets the respective zero points of the piston rods of the mold position adjusting cylinder actuators in a state where the upper and lower molds are in close contact with each other and the respective piston rods of the mold position adjusting cylinder actuators are in contact evenly with the slide block, and it controls the operation of the mold position adjusting cylinder actuators with reference to the zero points.

In another aspect of the present invention, a mold aligning device for a compression molding machine comprises a bed, a slide block supported for vertical sliding movement above the bed, driving means for vertically moving the slide block, and a mold consisting of an upper mold attached to a slide block and a lower block fixed to the bed for maintaining the upper mold in parallel to the lower mold in compression-molding a work by the mold. The mold aligning device comprises a plurality of mold position adjusting cylinder actuators mounted on the bed and a plurality of automatic gap compensating units mounted on the bed or the slide block coaxially respectively with the mold position adjusting cylinder actuators to adjust the respective positions of the mold position adjusting cylinder actuators relative to the slide block according to the height of the mold so that the slide block is born evenly on the piston rods of the mold position adjusting cylinder actuators.

BRIEF DESCRIPTION OF THE DRAWINGS

The above and other objects, features and advantages of the present invention will become more apparent from the following description taken in conjunction with the accompanying drawings, in which.

DESCRIPTION OF THE PREFERRED EMBODIMENTS

In first Embodiment

Figure 1:
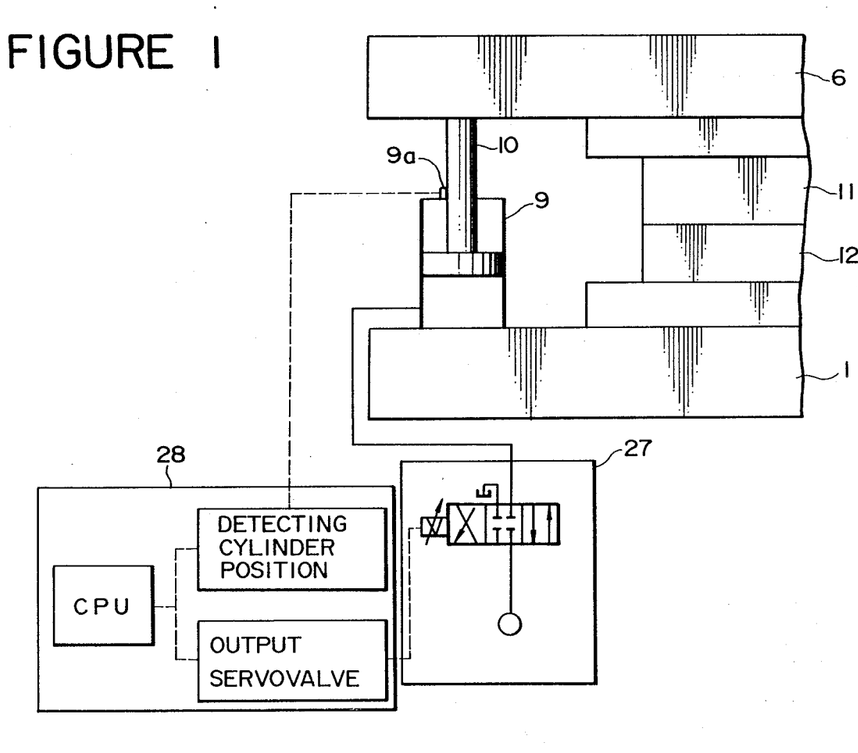
FIG. 1 is a diagrammatic illustration of a mold alignment control unit associated with a mold aligning device embodying the present invention as applied to a compression molding machine.
Figure 2:
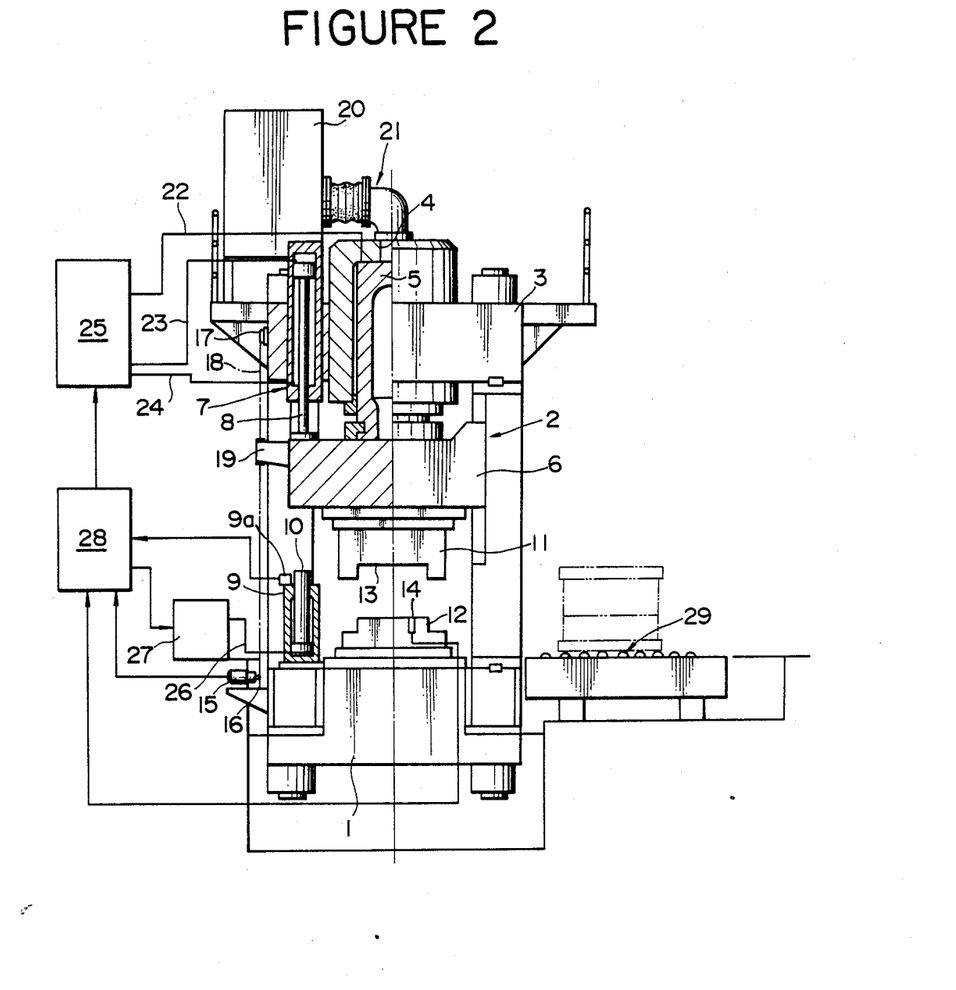
FIG. 2 is a front elevational view partly in section of a compression molding machine incorporating a mold aligning device in a first embodiment according to the present invention.
Figure 3:
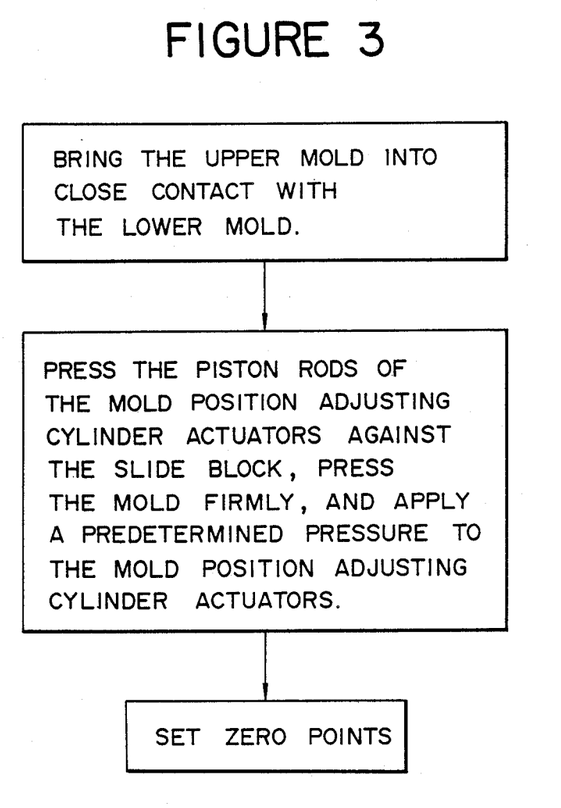
FIG. 3 is a floor chart of a program for setting the respective zero points of the piston rods of the mold position adjusting cylinder actuators of the mold aligning device of FIG. 2.

The first embodiment of the present invention is illustrated in FIGS. 1-3.

Shown in FIG. 2 is a compression molding machine for processing SMC, incorporating a mold aligning device in a first embodiment according to the present invention. The compression molding machine has a bed 1 fixedly installed on the floor, four uprights 2 standing upright respectively from the corners of the bed 1, a crown block 3 joined to the tops of the uprights 2, a slide block 6 guided for vertical sliding movement by the uprights 2, a main cylinder actuator 4 of a single acting type mounted on the crown block 3 in the central portion of the same and having a piston rod 5 projecting downward from the crown block 3 and joined to the slide block 6 at the lower end thereof, side cylinder actuators 7 mounted on the crown block 3 respectively on the right and left sides of the crown block 3 and each having a piston rod 8 joined to the slide block 6, and the mold aligning device.

The mold aligning device comprises four mold position adjusting cylinder actuators 9 each having a piston rod 10 disposed respectively at the corners of the bed 1, stroke detectors 9a each associated with the piston rod 10 of each mold position adjusting cylinder actuator 9, and a first hydraulic pressure unit 27 connected to the mold position adjusting cylinder actuators 9 by lines 26.

An upper mold 11 is detachably attached to the lower surface of the slide block 6, and a lower mold 12 is detachably fixed to the upper surface of the bed 1. When the upper mold 11 and the lower mold 12 are joined together, a cavity 13 is formed. The lower mold 12 is provided with a pressure sensor 14 for detecting the pressure within the cavity 13.

A rotary encoder 15 is attached to one side of the bed 1. A sprocket 16 mounted on the input shaft of the rotary encoder 15 and a sprocket 17 rotatably supported on one side of the crown block 3 are operatively interconnected with a chain 18. The opposite ends of the chain 18 are attached to a bracket 19 attached to the slide block 6. Thus, the rotary encoder 15 is able to detect the position and moving speed of the slide block 6.

A hydraulic fluid tank 20 is mounted on the crown block 3 and is connected via a prefill valve 21 to the main cylinder actuator 4. The main cylinder actuator 4 and the side cylinder actuator 7 are connected by lines 22, 23 and 24 to a second hydraulic pressure unit 25. The mold position adjusting cylinder actuators 9 are connected by the line 26 to the first hydraulic pressure unit 27. The second hydraulic pressure unit 25 and the first hydraulic pressure unit 27, the stroke detectors 9a, the pressure sensor 14, and the rotary encoder 15 are connected to a control unit 28.

Indicated at 29 is a mold conveyor table for conveying the upper mold 11 and the lower mold 12 to and away from the bed 1 of the compression molding machine.

In operation, a resin work piece is placed on the lower mold 12 with the slide block 6 positioned at the uppermost position. Then, the second hydraulic pressure unit 25 supplies working fluid through the line 22 and 23 to the main cylinder actuator 4 and the side cylinder actuator 7 to lower the slide block 6. The control unit 28 controls the lowering speed of the slide block 6 in steps. The lower surface of the slide block 6 comes into contact with the piston rods 10 of the mold position adjusting cylinder actuators 9 at a predetermined position. The mold position adjusting cylinder actuators 9 are controlled through the first hydraulic pressure unit 27 by the control unit 28 so that the upper mold 11 is kept in parallel with the lower mold 12 during the downward movement of the slide block 6. As the slide block 6 is lowered further, the resin work piece is compressed in the cavity 13 between the upper mold 11 and the lower mold 12. In this state, the pressure of the main cylinder actuator 4 is regulated so as to compress the resin work piece in a predetermined pressing pattern, while the mold position adjusting cylinder actuators 9 are controlled so that the upper mold 11 is maintained in parallel with the lower mold 12. Upon the completion of the compression molding operation, the slide block 6 is lifted up to separate the upper mold 11 from the lower mold 12, and then a molding thus formed in removed from the lower mold 12.

To maintain the upper mold 11 in parallel with the lower mold 12, the respective strokes of the piston rods 10 of the mold position adjusting cylinder actuators 9 are controlled with reference to the corresponding zero points of the piston rods 10. The zero point of the piston rod 10 of each mold position adjusting cylinder actuator 9 is set in the following manner.

As shown in FIG. 1, the slide block 6 is lowered to bring the upper mold 11 into close contact with the lower mold 12. Then, the slide block 6 is pressed by the main cylinder actuator 4 and the side cylinder actuator 7 to hold the upper mold 11 in close contact with the lower mold 12 while the piston rod 10 of each mold position adjusting cylinder actuator 9 is projected until the extremity of the piston rod 10 is pressed against the lower surface of the slide block 6 at a predetermined pressure. In this state, the position of the piston rod 10 is detected by the stroke detector 9a, and the position of the piston rod 10 in this state is stored as a zero point in the control unit 28.

During a compression-molding operation, the stroke of the piston rod 10 of each mold position adjusting cylinder actuator 9 is controlled with reference to the zero point so that the upper mold 11 is maintained in parallel with the lower mold 12. Thus, the mold aligning device eliminates the use of shims and facilitates the mold aligning work. Furthermore, the alignment of the upper and lower molds can be controlled at a high accuracy, because neither the measurement of gaps nor the measurement of shims is necessary, and hence the accuracy of the control operation is not deteriorated by errors in measurement.

The Second Embodiment

The second embodiment of the present invention is illustrated in FIGS. 4–7.

Figure 4:
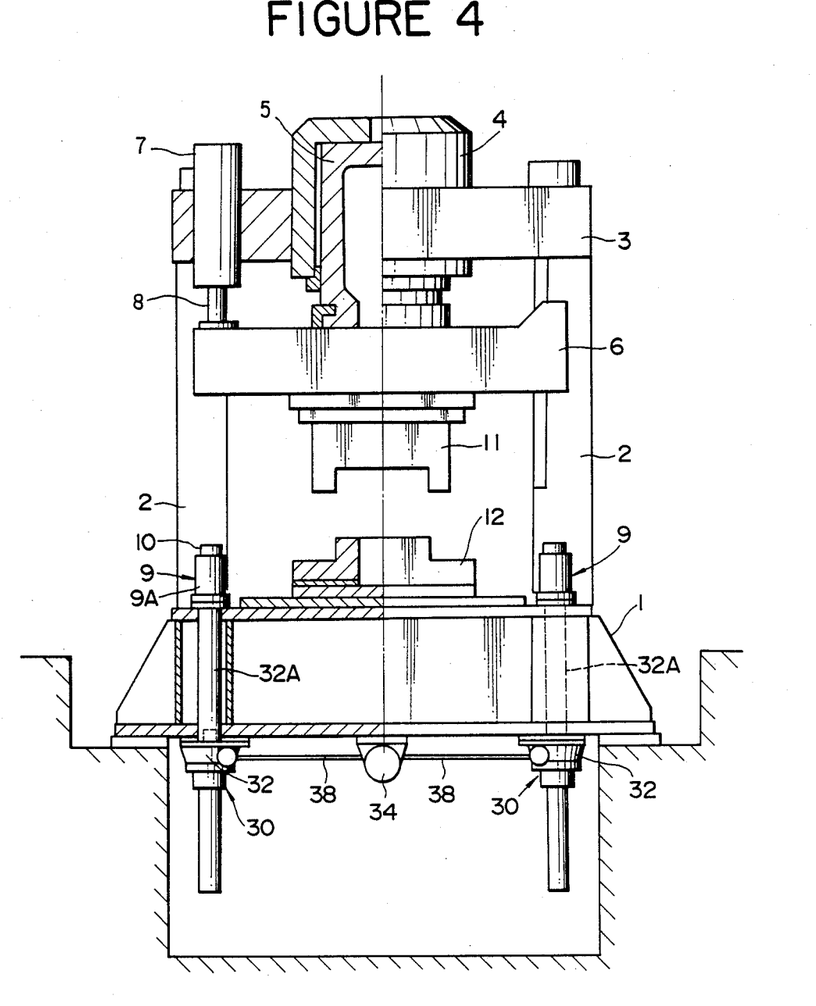
FIG. 4 is a front elevational view of a mold aligning device in a second embodiment according to the present invention as incorporated in a compression molding machine.

Shown in FIG. 4 is a compression molding machine for processing SMCs, incorporating a mold aligning device. The compression molding machine has a bed 1 fixedly installed on the floor, four uprights 2 standing upright, respectively, from the corners of the bed 1, a crown block 3 joined to the tops of the uprights 2, a slide block 6 guided for vertical sliding movement by the uprights 2, a main cylinder actuator 4 mounted on the crown block 3 and having a piston rod 5 joined to the slide block 6, side cylinder actuators 7 mounted on the crown block 3 respectively on the right and left sides of the main cylinder actuator 4 and each having a piston rod joined to the slide block 6, and the mold aligning device.

A mold consists of an upper mold 11 detachably attached to the lower surface of the slide block 6 and a lower mold detachably attached to the bed 1. The mold aligning device comprises four mold position adjusting cylinder actuators 9 each having a cylinder 9A and a piston rod 10 and disposed respectively at the corners of the bed 1, four gap compensating units 30 each having a screw jack 32 (which may be substituted by a hydraulic servomechanism) having a screw rod 32A, a driving mechanism for driving the screw jacks 32 of the gap compensating units 30 comprising a driving motor 34, bevel gear units 36, and transmission shafts 38, a rotation detector 40 for detecting the number rotations of the output shaft of the driving motor 34, a central processing unit (CPU) 42, and a terminal 44.

Figure 5:
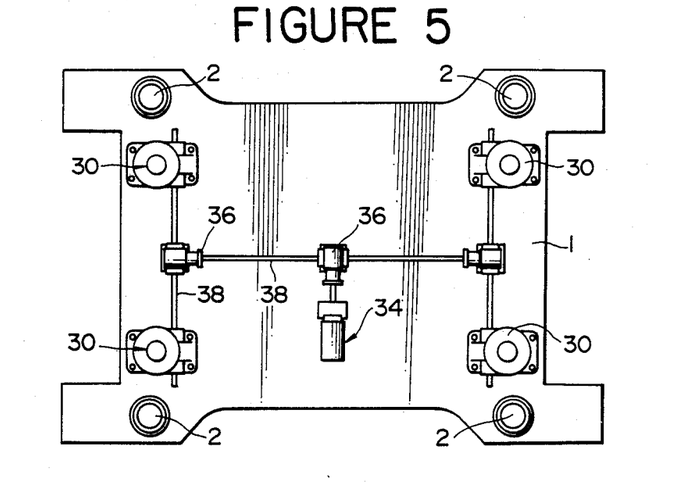
FIG. 5 is a bottom view of the compression molding machine of FIG. 4.

The screw jacks 32 are fixedly mounted on the bed 1 coaxially with the mold position adjusting cylinder actuators 9, respectively, and the upper ends of the screw rods 32A of the screw jacks 32 are joined respectively to the cylinders 9A of the mold position adjusting cylinder actuators 9. The driving motor 34, the bevel gear units 36, and the transmission shafts 38 are arranged on the lower surface of the bed 1 as shown in FIG. 5. The movement of the screw rod 32A of each screw jack 32 is controlled by the CPU 42 on the basis of detection signals provided by the rotation detector 40.

Figure 6:
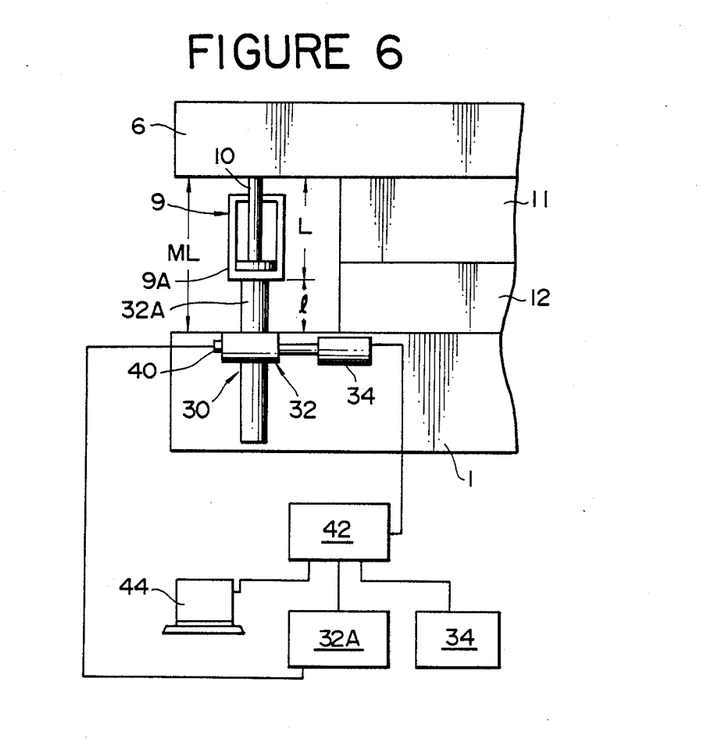
FIG. 6 is a diagrammatic illustration explaining the function of the mold aligning device of FIG. 4.
Figure 7:
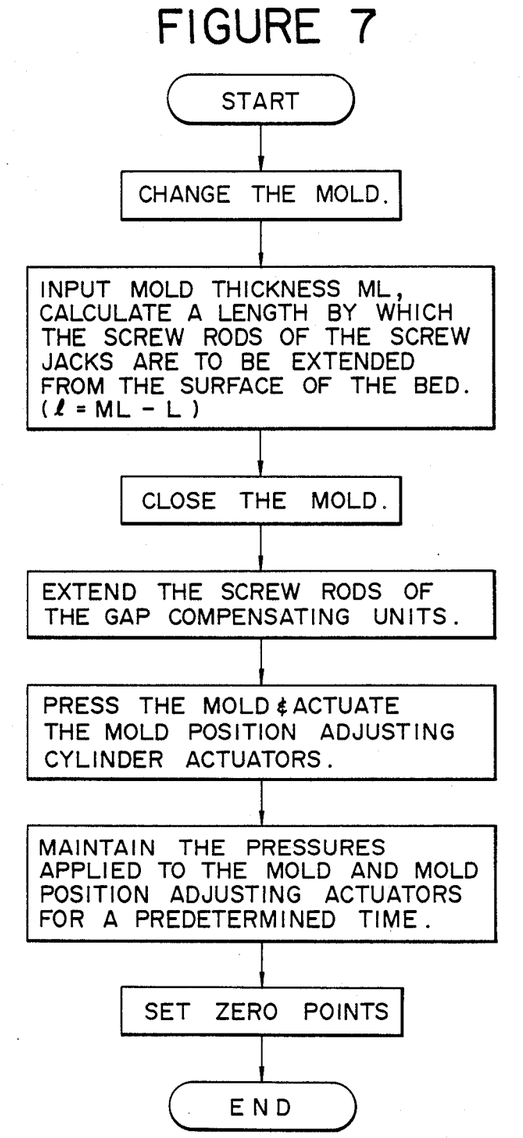
FIG. 7 is a flow chart showing the steps of mold leveling operation to be executed by the mold leveling device of FIG. 4.

The manner of zero-point adjustment for the gap compensating units 30 will be described hereinafter with reference to FIGS. 6 and 7. When a new mold is mounted on the compression molding machine, the height (thickness) ML Of the mold is given to the CPU 42 by operating the terminal 44. Then, the CPU 42 calculates a length l by which the screw rods 32A of the screw jacks 32 are to be projected from the upper surface of the bed 1—namely, the difference (ML - L) between the height ML of the mold and the overall length L of the mold position adjusting cylinder actuators 9. Then, the slide block 6 is lowered to bring the upper mold 11 into close contact with the lower mold 12. Then, the driving motor 34 is actuated to project the screw rods 32A of the screw jacks 32 by the calculated length l from the upper surface of the bed 1, and thereby the mold position adjusting cylinder actuators 9 are raised to set positions, respectively. The projection of the screw rods 32A by the length l is detected through the detection of the number of times of rotation of the output shaft of the driving motor 34 by the rotation detector 40. Then, the upper mold 11 is pressed against the lower mold 12 by the main cylinder actuator 4 and the side cylinder actuators 7 to close the mold firmly, and then working fluid is supplied to the mold position adjusting cylinder actuators 9 to project the piston rods 10 so that the piston rods 10 are pressed against the lower surface of the slide block 6. After maintaining the state for a predetermined time, the respective positions of the piston rods 10 of the mold position adjusting cylinder actuators 9 are measured and stored in a control unit (not shown), as the respective zero points of the piston rods 10. The mode of controlling the mold position adjusting cylinder actuators 9 during compression-molding operation is the same as that for the first embodiment, and hence the description thereof will be omitted.

The Third Embodiment

Figure 8:
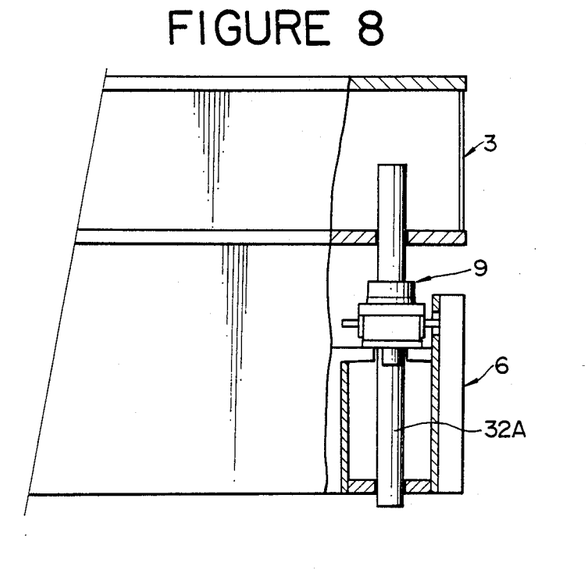
FIG. 8 is a fragmentary front elevational view partly in section of a mold aligning device in a third embodiment according to the present invention.
Figure 9:
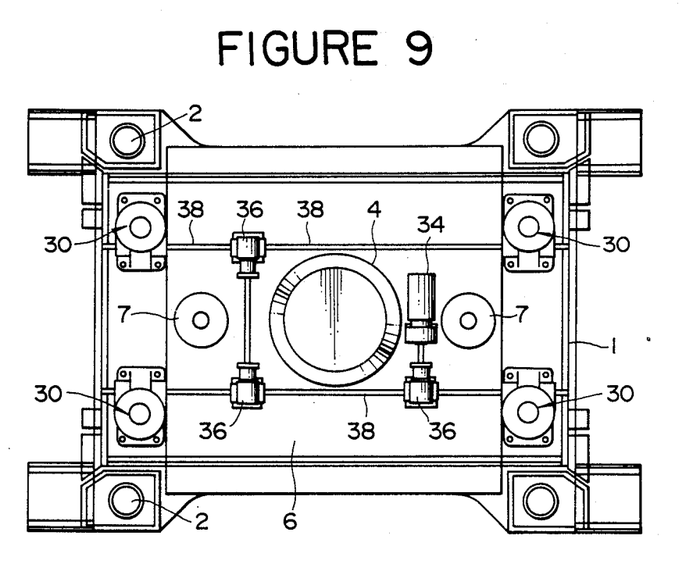
FIG. 9 is a plan view of the mold aligning device of FIG. 8.

The third embodiment of the present invention is shown in FIGS. 8 and 9.

A mold aligning device in a third embodiment according to the present invention is substantially the same as that in the second embodiment, except that the driving mechanism for driving the gap compensating units 30 is provided on the upper surface of the slide block 6. The gap compensating units 30 are aligned respectively with the mold position adjusting cylinder actuators 9. Both the mold position adjusting cylinder actuators 9 and the gap compensating units 30 may be mounted on the slide block 6.

Thus, in the second and third embodiment, the mold position adjusting cylinder actuators 9 are moved respectively to appropriate positions by the gap compensating units 30 for zero-point adjustment instead of projecting the piston rods 10 of the mold position adjusting cylinder actuators 9, when the mold is changed. Accordingly, zero-point adjustment of the mold position adjusting cylinder actuators 9 can easily be achieved without requiring any gap adjusting rods or shims.

Furthermore, since the mold position adjusting cylinder actuators 9 are moved to appropriate positions by the gap compensating units 30 and hence the piston rods 10 of the mold position adjusting cylinder actuators 9 need to be projected only by a small length for zero-point adjustment, the mold position adjusting cylinder actuators 9 may be of a short-stroke type, which enables accurate mold aligning operation.

Although the invention has been described in its preferred forms with a certain degree of particularity, many changes and variations are possible therein. It is therefore to be understood that the present invention may be practiced otherwise than specifically described herein without departing from the scope and spirit thereof.

What is claimed is:

1. A compression molding machine comprising:
   (a) a bed;
   (b) a plurality of uprights projecting upwardly from said bed;
   (c) a crown block mounted on said plurality of uprights;
   (d) a slide block guided for vertical sliding movement on said plurality of uprights;
   (e) a main cylinder actuator mounted on said crown block and having a piston rod joined to said slide block;
   (f) an upper mold detachably attached to the lower surface of said slide block;
   (g) a lower mold detachably attached to the upper surface of said bed;

(h) a plurality of mold position adjusting cylinder actuators mounted on said bed, each one of said plurality of mold position adjusting cylinder actuators comprising a cylinder and a piston rod projecting upwardly from said bed;

(i) a plurality of screw jacks, each one of said screw jacks comprising a screw rod operatively connected to said piston rod of an associated one of said plurality of mold position adjusting cylinder actuators;

(j) a driving motor mounted on said bed, said driving motor having an output shaft;

(k) a plurality of bevel gear units and transmission shafts operatively connecting said output shaft of said driving motor unit to said plurality of screw jacks;

(l) a rotation detector for detecting the number of rotations of said output shaft of said driving motor;

(m) a central processing unit operatively connected to said rotation detector and to said driving motor unit; and (n) a terminal for controlling said central processing unit.

2. A compression molding machine as recited in claim 1 and further comprising a plurality of side cylinder actuators mounted on said crown block, each one of said plurality of side cylinder actuators having a piston rod joined to said slide block.

3. A compressing molding machine as recited in claim 1 wherein said driving motor is mounted underneath said bed.

4. A compression molding machine as recited in claim 1 wherein said driving motor is mounted above said bed.

* * * * *